United States Patent
Lowe et al.

[11] 3,861,882
[45] Jan. 21, 1975

[54] PROCESS FOR PREPARING RED PHOSPHORUS

[75] Inventors: Edward James Lowe, Stourton, nr. Stourbridge; Frederick Arthur Ridgway, Stourbridge, both of England

[73] Assignee: Hooker Chemical Corporation, Niagara Falls, N.Y.

[22] Filed: Oct. 12, 1971

[21] Appl. No.: 188,604

Related U.S. Application Data

[63] Continuation of Ser. No. 599,915, Dec. 7, 1966, abandoned.

[52] U.S. Cl. ................ 23/293 R, 23/294, 423/299, 423/322
[51] Int. Cl. ............................................ C01b 25/02
[58] Field of Search ...... 423/322, 299; 23/294, 264, 23/293 R

[56] References Cited
UNITED STATES PATENTS

| | | | |
|---|---|---|---|
| 2,476,335 | 7/1949 | Tusson | 23/223 |
| 2,800,396 | 7/1957 | Udy | 23/223 |
| 3,025,140 | 3/1962 | Schreiner et al. | 23/223 |
| 3,039,854 | 6/1962 | Williams | 23/223 |
| 3,056,660 | 10/1962 | Williams | 23/223 |
| 3,207,583 | 9/1965 | Brautigam | 23/223 |
| 3,371,994 | 3/1968 | Lowe | 23/223 |

OTHER PUBLICATIONS

"Phosphorus & Phosphides," Kirk & Othmer's Encyclopedia of Chemical Technology, 2nd Ed., Vol. 15, pp. 276–286.
Hackh's Chem. Dictionary, 3rd Ed., 1944, p. 649.

*Primary Examiner*—Wilbur L. Bascomb, Jr.
*Assistant Examiner*—R. T. Foster
*Attorney, Agent, or Firm*—Peter F. Casella; James F. Mudd

[57] ABSTRACT

There is provided a method for preparing phosphorus compounds wherein phosphorus vapor containing $P_2$ molecules is condensed at a temperature below the solidification point of red phosphorus and the resulting solid is then reacted with a phosphorus-reactive material. When the phosphorus-reactive material is water at an elevated temperature, phosphine is produced.

5 Claims, 1 Drawing Figure

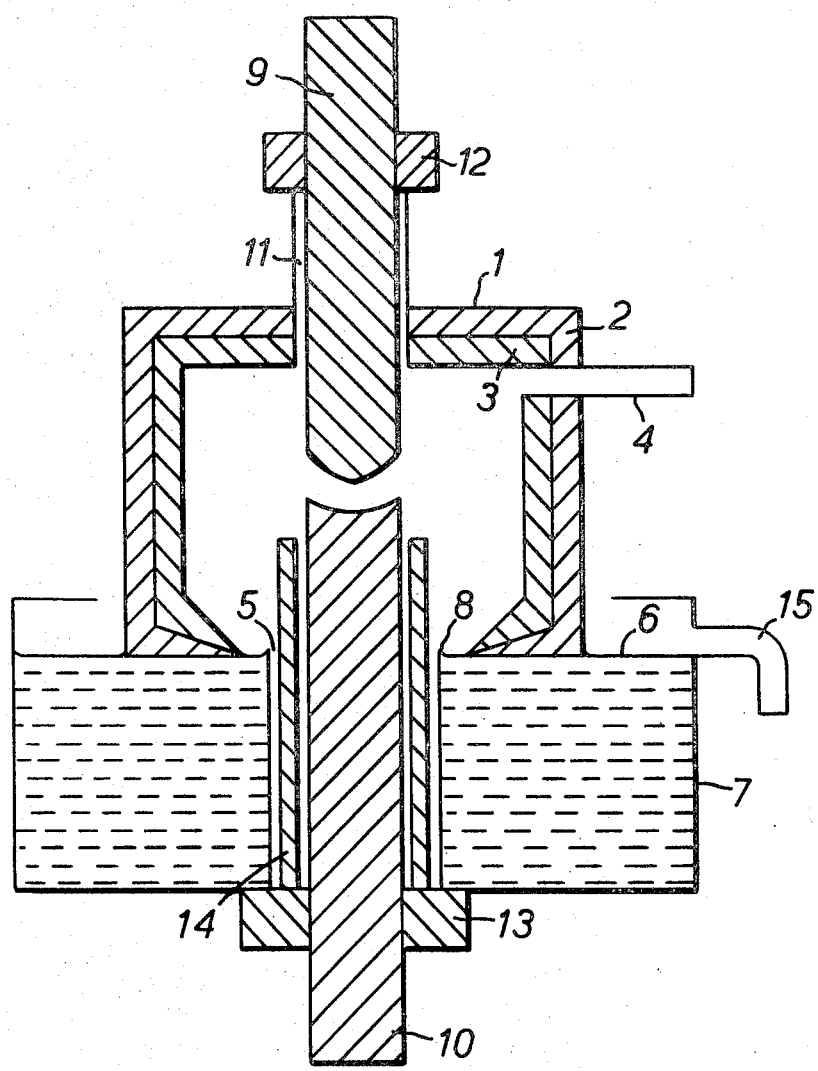

PROCESS FOR PREPARING RED PHOSPHORUS

This is a continuation, of application Ser. No. 599,915, filed Dec. 7, 1966 and now abandoned.

The present invention relates to a process for preparing phosphine and other phosphorus derivatives and to a preferred method and apparatus for performing the first stage in the said process which is a process for preparing a reactive form of red phosphorus.

We have described in our British Patent No. 990,918 a process for preparing phosphine which comprises reacting phosphorus with a water/phosphorus pentoxide system at elevated temperatures and substantially atmospheric pressure. In the above specification it was noted that white phosphorus is converted, under these conditions into red phosphorus in a highly reactive form. The red phosphorus then reacts rapidly with the water to form phosphine.

Red phosphorus is normally prepared by heating white phosphorus in the absence of water, and when so prepared it is obtained in a coarse form which does not readily undergo chemical reactions. White phosphorus is prepared by condensing phosphorus vapour. It has been reported (see Melville and Gray, Trans. Fara. Soc. 32 P.271, 1936) that when phosphorus vapour under reduced pressure is quenched rapidly from a high temperature, red phosphorus is formed. Hitherto this has been achieved only in the laboratory, by passing the vapour at a low pressure and a temperature of about 800°C over a cooled surface. Such a method is unsuitable for commercial operation.

It is known that, at very high temperatures, phosphorus vapour exists in the form of $P_2$ molecules, and that when the vapour is cooled slowly these combine to form a vapour containing $P_4$ molecules, which condenses to form white phosphorus.

We have now discovered that whenever a vapour comprising $P_2$ molecules is condensed, the resulting phosphorus comprises red phosphorus in a highly reactive form, suitable for reacting with water to prepare phosphine. We have further discovered that the condensation of phosphorus vapour containing $P_2$ molecules by quenching in a cold liquid affords an improved method for preparing the reactive red phosphorus on a commercial scale and that the phosphorus so obtained is in a more reactive form that that which may be obtained by quenching phosphorus vapour on a cooled surface.

According to one aspect therefore, our invention consists in a process for preparing derivatives of phosphorus which comprises condensing a phosphorus vapour containing $P_2$ molecules at a temperature below the solidification point of red phosphorus, and reacting the solid phosphorus so formed with a phosphorus-reactive material. Preferably the phosphorus is reacted with a water/phosphorus pentoxide system to form phosphine.

A second aspect of our invention provides a preferred method by which the condensation of the vapour according to the first aspect may be performed. According to this second aspect, our invention provides a method for preparing a reactive red phosphorus which comprises quenching phosphorus vapour containing $P_2$ molecules by direct contact with a liquid at a temperature below the solidification point of red phosphorus.

The dissociation of phosphorus vapour into $P_2$ molecules is dependent on temperature and pressure. At atmospheric pressure the vapour begins to dissociate at about 800°C and the proportion of $P_2$ increases with the temperature, the vapour consisting of substantially 100% $P_2$ molecules at a temperature of about 1200°C. At lower pressures the dissociation occurs at lower temperatures.

In order to prepare red phosphorus it is necessary to cool the $P_2$ containing vapour to the solidification temperature of red phosphorus sufficiently quickly to prevent a substantial number of $P_2$ molecules from recombining. In the method described by Mulville and Gray, the vapour is condensed at low pressures on a cooled surface, and under these conditions the phosphorus the form of plates. We have discovered that when the $P_2$ containing vapour is quenched with a cold liquid it forms a fluffy mass of red phosphorus, which is more reactive than the plates previously obtained. Moreover the condensation of vapour at low pressure is an unsatisfactory method for the preparation of reactive red phosphorus on a commercial scale. We prefer to heat the vapour to a temperature of at least 1200°C and then cool rapidly at atmospheric pressure to a temperature below 450°C.

Preferably the phosphorus vapour is heated by an electric arc and then rapidly quenched for example with a large volume of cold inert liquid such as water.

A third aspect of our invention provides an apparatus for preparing reactive red phosphorus which apparatus comprises an arc chamber of a non metallic refractory material, provided with an inlet and an outlet for phosphorus vapour, a pair of graphite electrodes for forming an electric arc in the chamber, and means for quenching the vapour at the outlet with cold water.

Preferably the arc chamber is lagged with a suitable heat resistant insulant, e.g. silicate wool. Conveniently the phosphorus vapour outlet may be in the base of the chamber and be submerged or submersible in a tank of cold water. The vapour inlet may be situated in the upper part of the chamber. In one modification of the apparatus the electrodes are arranged longitudinally with respect to the arc chamber, the vapour inlet being situated near one end and the outlet near the other end. The electrode on the downstream side of the arc is preferably protected by means of a refractory liner. The electrodes and arc chamber may be vertically disposed, the outlet being in the form of an annular opening in the base of the arc chamber.

Means may be provided to collect and remove solid red phosphorus at the vapour outlet. For example where the outlet is submerged in a liquid-containing tank, the tank may be provided with means for circulating a liquid therethrough. The liquid removed from the tank contains the red phosphorus as a slurry. Filtration means may be provided to recover the solid phosphorus, or else, where the liquid is water, the slurry may be passed directly to a phosphine generator and heated above 250°C in the presence of sufficient phosphorus pentoxide or condensed phosphoric acids to maintain the system in the liquid state at substantially atmospheric pressure. Desirably the production of phosphine occurs in the substantial absence of metal and it is preferred, therefore, to construct the phosphine generator of a suitable non metallic substance such as graphite or silica.

An apparatus for performing the method of our invention will be described with reference to the accompanying drawing which is a vertical cross section. The apparatus comprises a cylindrical arc chamber 1 which may be of stainless steel lined with a refractory material 2 and insulated on the inside with, for example, silicate wool 3. The arc chambr is provided with an inlet 4 for phosphorus vapour and an outlet 5 submerged at or below the level of water 6 in an annular collecting tank 7. The top of the circular inner wall 8 of the collecting tank 7 lies within the outlet 5. Carbon electrodes 9 and 10 are situated along the vertical axis of the arc chamber 1. The upper electrode 9 enters the arc chamber through an opening 11 in the top of the chamber, which opening is sealed by a stuffing box 12. The lower electrode 10 enters the arc chamber through the space in the centre of the annular collecting tank, which is sealed by the stuffing box 13. The lower part of the electrode 10 is surrounded by a refractory liner 14. The collecting tank 7 is provided with an overflow pipe 15.

Phosphorus vapour is admitted continuously to the arc chamber through the inlet 4, and an arc is struck between the electrodes 9 and 10. The heated vapour passes through the submerged outlet 5 and is rapidly quenched by the water in the collecting tank 7. Water is continuously admitted to the collecting tank and a slurry of red phosphorus and water is continuously removed through the overflow pipe 15.

The phosphorus prepared according to our invention is suitable for the preparation of phosphines by reaction with a water/phosphorus pentoxide system to form phosphine according to the first aspect of our invention. This reaction is more fully described in our said Pat. No. 990,918.

The phosphorus is also highly reactive with a variety of other reagents. Red phosphorus prepared in accordance with our invention may be reacted with halogens such as chlorine, fluorine, bromine or iodine, with oxygen or sulphur, or with metals such as zinc, sodium, copper etc.

The invention will be illustrated by the following Example.

Phosphorus vapour at a temperature of 350°C was passed into the apparatus described with reference to the drawing at a rate of 3.5g. per minute. An arc was struck between the 6 mms. diameter graphite electrodes taking 30 amps direct current at 30 volts. Water was added to the collecting tank at such a rate as to maintain the temperature of the red phosphorus-water slurry at 60°C. The process was operated continuously for 7 hours after which time the collected slurry contained 1400 grams of condensed phosphorus comprising 85% red phosphorus and 15% extractable phosphorus.

100 grams of the phosphorus were heated with a 2 inch deep layer of phosphoric acid in a 11 cms. diameter graphite vessel. Steam was added to the vessel to maintain a reaction temperature of 275°–285°C. 49.2 litres of gaseous reaction product were evolved in a total reaction time of 230 minutes, and contained 90 volume per cent phosphine.

What we claim is:

1. Method of preparing red phosphorus which comprises contacting phosphorus vapor which is at a temperature above 800° centigrade and which contains a substantial proportion of $P_2$ molecules, with sufficient inert liquid which is at a temperature below the solidification point of red phosphorus, to condense the vapor.

2. Method of preparing red phosphorus in accordance with claim 1 which comprises heating phosphorus vapor to a temperature above 800° centigrade at substantially atmospheric pressure whereby the vapor contains a substantial proportion of $P_2$ molecules, condensing the vapor by quenching the vapor while at a temperature above 800° centigrade and containing a substantial proportion of $P_2$ molecules, with sufficient inert liquid which is at a temperature below the solidification point of red phosphorus to condense the vapor, and recovering the red phosphorus thus produced.

3. Method according to claim 2 wherein the temperature of the vapor is at least 1200° centigrade.

4. Method according to claim 2 wherein the inert liquid is water.

5. Method according to claim 2 wherein the vapor is heated by an electric arc.

* * * * *

UNITED STATES PATENT OFFICE
CERTIFICATE OF CORRECTION

PATENT NO. : 3,861,882
DATED : January 21, 1975
INVENTOR(S) : Edward James Lowe et al It is certified that error appears in the above-identified patent and that said Letters Patent are hereby corrected as shown below:

At Column 1, line 46, for "that that" read "than that".

At Column 2, line 10, for "Mulville" read "Melville".

At Column 2, lines 12 and 13, for "the phosphorus the form of plates." read "the phosphorus is deposited on the surface in the form of plates.".

At Column 3, line 3, for "chambr" read "chamber".

Signed and sealed this 17th day of June 1975.

(SEAL)
Attest:

RUTH C. MASON
Attesting Officer

C. MARSHALL DANN
Commissioner of Patents
and Trademarks